(No Model.)
J. KRENIG & J. EBURT.
BRICK OR TILE.
No. 429,925. Patented June 10, 1890.
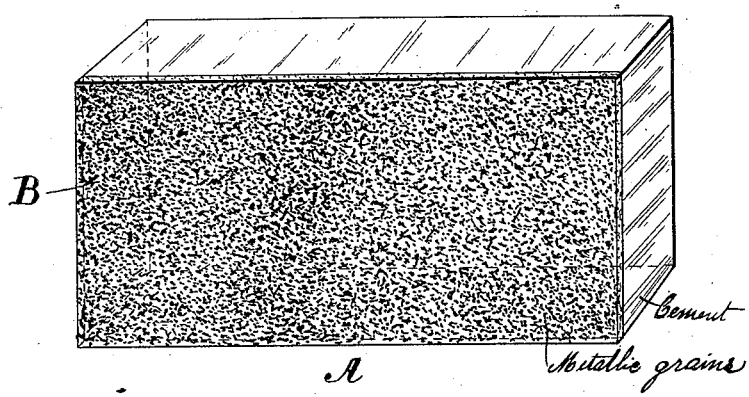
WITNESSES:
INVENTORS
ATTORNEY

UNITED STATES PATENT OFFICE.

JOSEPH KRENIG, OF BROOKLYN, NEW YORK, AND JOHANN EBURT, OF STADTLAUERINZEN, GERMANY.

BRICK OR TILE.

SPECIFICATION forming part of Letters Patent No. 429,925, dated June 10, 1890.

Application filed March 24, 1890. Serial No. 345,074. (No model.)

*To all whom it may concern:*

Be it known that we, JOSEPH KRENIG, of Brooklyn, county of Kings, and State of New York, and JOHANN EBURT, of Stadtlauerinzen, Germany, have invented certain new and useful Improvements in Bricks or Tiles, of which the following is a full, clear, and exact description, reference being had to the accompanying drawing, and to the letters of reference marked thereon.

The object of this invention is to provide an improved unburned brick or tile composed of hydraulic cement and sand and having its exposed or wearing surface formed of a powdered or granulated mineral substance that is pressed into the body of the brick or tile while the latter is green or undried.

The drawing represents one of our improved bricks or tiles in perspective.

The body A of the brick or tile is composed of hydraulic cement and sand mixed together and properly moistened with water. One part, by bulk, of cement and three parts, by bulk, of sharp sand will make a very durable brick; but we do not confine ourselves to these exact proportions. The mixture, being properly manipulated to thoroughly incorporate the two substances with each other, is then put into suitable molds, and before it sets, and while still in the mold, a facing B of a powdered or granulated mineral substance—such as an ocher, oxide of any metal, powdered or granulated metal, or metallic alloy—is put upon the exposed surface of the brick or tile and pressed into the body thereof, so that it becomes thoroughly incorporated therewith, and when the brick or tile is dry forms a metallic face thereon impervious to water and capable of withstanding an unusual amount of wear and exposure.

We do not burn or fire our improved bricks or tiles, but use them solely in their unburned condition, so that they are not glazed. The metallic facing is not fused, but is simply pressed dry into the substance of the green brick or tile and held there by cohesion.

We are aware of the United States Patent No. 401,098, but do not claim the article therein described.

Having thus described our invention, we claim as new and desire to secure by Letters Patent—

As a new article of manufacture, an unburned brick or tile composed of a mixture of moistened hydraulic cement and sand, and having a face consisting of metallic powder or grains that are pressed into and thereby incorporated with the body of the brick or tile, substantially as herein shown and described.

In testimony that we claim the foregoing we have hereunto set our hands, in the presence of two witnesses, this 2d day of October, 1889.

JOSEPH KRENIG.
JOHANN EBURT.

Witnesses:
JACOB J. STORER,
HERBERT VALENTINE.